(12) United States Patent
Akizuki et al.

(10) Patent No.: US 10,824,431 B2
(45) Date of Patent: Nov. 3, 2020

(54) RELEASING RENAME REGISTERS FOR FLOATING-POINT OPERATIONS

(71) Applicant: FUJITSU LIMITED, Kawasaki-shi, Kanagawa (JP)

(72) Inventors: Yasunobu Akizuki, Kawasaki (JP); Atushi Fusejima, Kawasaki (JP); Norihito Gomyo, Tama (JP); Ryohei Okazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 16/416,335

(22) Filed: May 20, 2019

(65) Prior Publication Data
US 2019/0384608 A1 Dec. 19, 2019

(30) Foreign Application Priority Data

Jun. 13, 2018 (JP) .................................. 2018-112443

(51) Int. Cl.
*G06F 9/38* (2018.01)
*G06F 9/30* (2018.01)
*G06F 9/50* (2006.01)

(52) U.S. Cl.
CPC ............ *G06F 9/384* (2013.01); *G06F 9/3013* (2013.01); *G06F 9/30098* (2013.01);
(Continued)

(58) Field of Classification Search
CPC ..... G06F 9/384; G06F 9/3865; G06F 9/30098
See application file for complete search history.

(56) References Cited

U.S. PATENT DOCUMENTS

| 6,094,716 A | 7/2000 | Witt |
| 2001/0004755 A1* | 6/2001 | Levy .................... G06F 9/3832 712/217 |

(Continued)

FOREIGN PATENT DOCUMENTS

| JP | 2002-175181 | 6/2002 |
| JP | 2002-520729 | 7/2002 |
| WO | 00/04444 | 1/2000 |

OTHER PUBLICATIONS

Teresa Monreal, Victor Vinals, Jose' Gonzaez, Antonio Gonzalez and Mateo Valero, "Late Allocation and Early Release of Physical Registers", October, IEEE, vol. 53, pp. 1244-1258 (Year: 2004).*

(Continued)

*Primary Examiner* — Aimee Li
*Assistant Examiner* — Courtney P Carmichael-Moody
(74) *Attorney, Agent, or Firm* — Fujitsu Patent Center

(57) ABSTRACT

An arithmetic circuit performs a floating-point operation. A floating-point register includes entries each allocated to an architectural register or a renaming register. An operation execution controller circuit issues a floating-point operation instruction and outputs a termination report of the floating-point operation before the floating-point operation is terminated. When exception handling is not performed at the time of instruction completion even when an exception is detected in the operation of the floating-point operation instruction, an instruction completion controller circuit outputs a release instruction that indicates a release of a renaming register when instruction execution is completed after the termination report is received. An instruction decoder circuit receives the release instruction, allocates a first entry allocated to an architectural register that stores an execution result of the floating-point operation to a renaming register, and allocates a second entry allocated to a renaming
(Continued)

register in the floating-point operation to the architectural register.

6 Claims, 15 Drawing Sheets

(52) U.S. Cl.
CPC ........ *G06F 9/30196* (2013.01); *G06F 9/3842* (2013.01); *G06F 9/3865* (2013.01); *G06F 9/5022* (2013.01)

(56) References Cited

U.S. PATENT DOCUMENTS

| | | | |
|---|---|---|---|
| 2002/0042872 A1 | 4/2002 | Kunimatsu et al. | |
| 2007/0113060 A1* | 5/2007 | Lien .................. | G06F 9/384 712/244 |
| 2008/0229080 A1* | 9/2008 | Kan .................. | G06F 9/384 712/221 |
| 2008/0276076 A1* | 11/2008 | Abernathy ............ | G06F 9/3836 712/217 |
| 2011/0087865 A1* | 4/2011 | Barrick ................ | G06F 9/3838 712/225 |
| 2014/0289501 A1* | 9/2014 | Schon ................. | G06F 9/3857 712/217 |

OTHER PUBLICATIONS

Derso Sima, "The Design Space of Register Renaming Techniques", October, IEEE, vol. 20, pp. 70-83 (Year: 2000).*

* cited by examiner

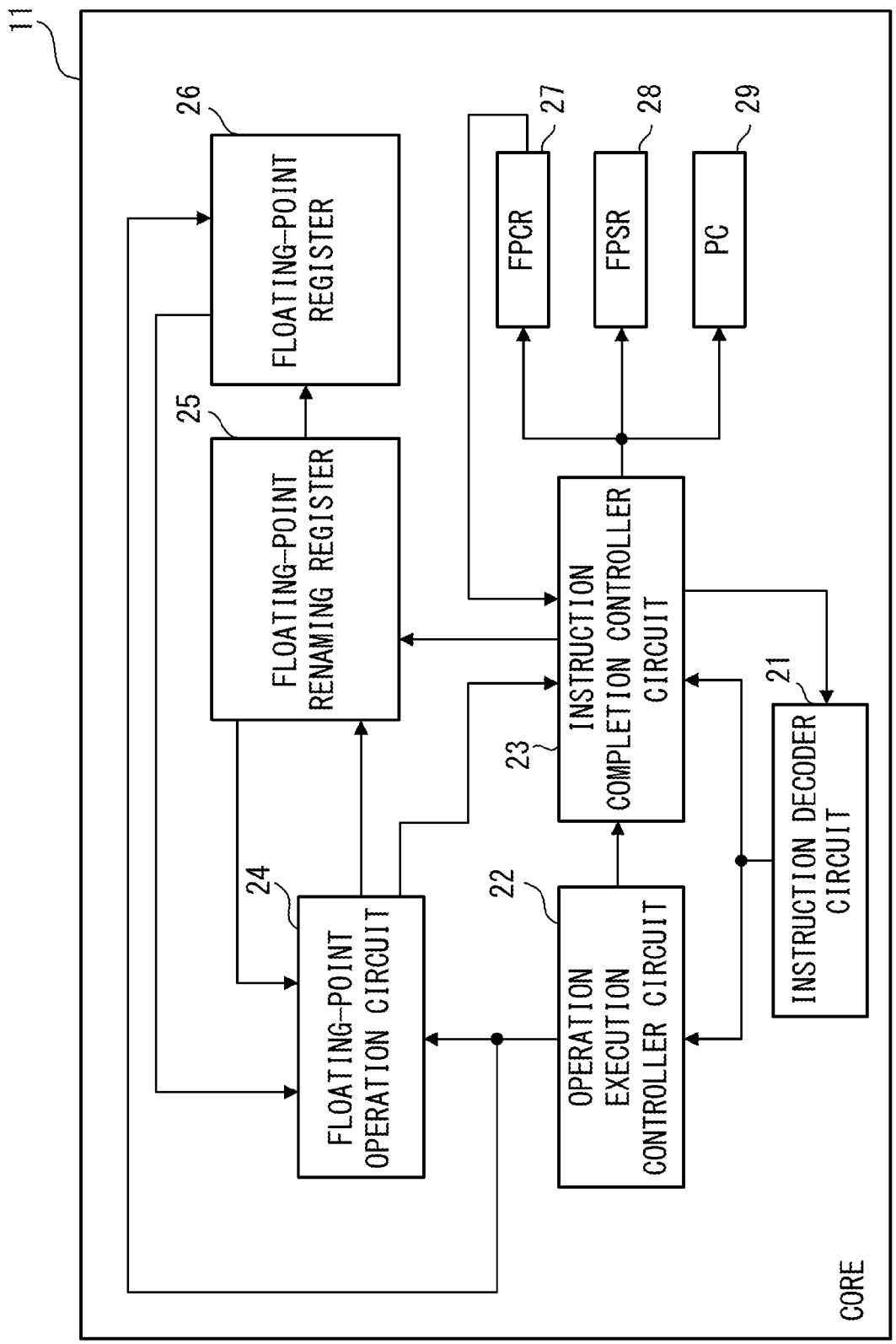
F I G. 1

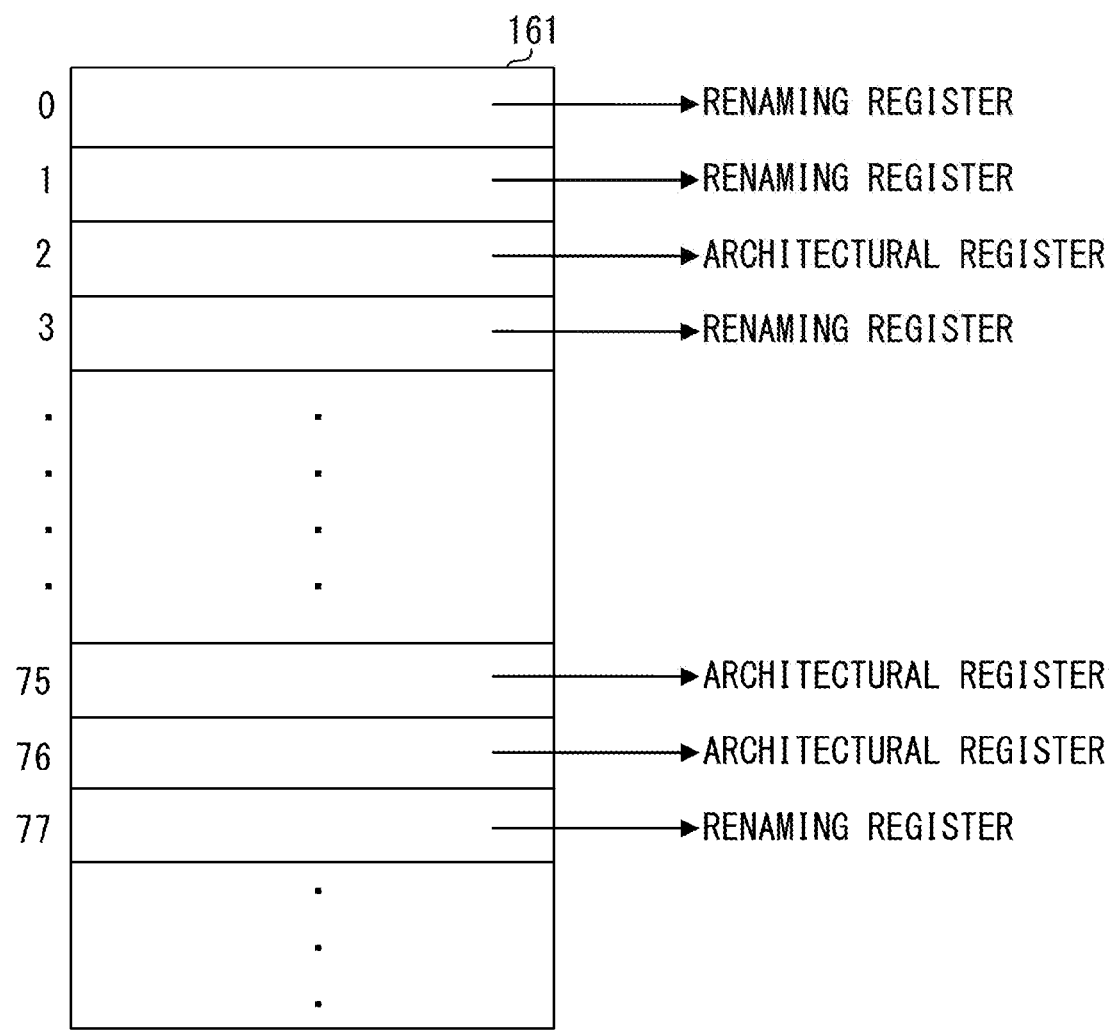
F I G. 6

RELEASING RENAME REGISTERS FOR FLOATING-POINT OPERATIONS

CROSS-REFERENCE TO RELATED APPLICATION

This application is based upon and claims the benefit of priority of the prior Japanese Patent Application No. 2018-112443, filed on Jun. 13, 2018, the entire contents of which are incorporated herein by reference.

FIELD

The embodiments discussed herein relate to an arithmetic processor and a control method of an arithmetic processor.

BACKGROUND

In an arithmetic processor that can execute program instructions by using an out-of-order technique, which allows execution from an executable instruction regardless of the order of the instructions in a machine language program, an architectural register (GPR: General Purpose Register), a floating point register (FPR), and a renaming register are sometimes separated to constitute a register. In this case, the arithmetic processor completes instructions in order that is the original order of the instructions in a machine language program after a result of out-of-order execution of operation instructions is stored in a renaming register. The arithmetic processor reads out the result of execution from the renaming register at the time of instruction completion, and stores the result in an architectural register.

A technology has been known in which when a transfer instruction is detected, processing of the instruction is executed at high speed by reallocating a renaming register relating to a source register as a destination register without executing the transfer instruction (See Patent Document 1 for example). In addition, a technology to perform flexible register renaming without complicating the hardware has been known (See Patent Document 2 for example).

Patent Document 1: Japanese National Publication of International Patent Application No. 2002-520729

Patent Document 2 Japanese Laid-open Patent Publication No. 2002-175181

SUMMARY

According to an aspect of the embodiments, an arithmetic processor includes an arithmetic circuit, a floating-point register, an operation execution controller circuit, an instruction completion controller circuit, and an instruction decoder circuit.

The arithmetic circuit performs a floating-point operation.

The floating-point register includes plural entries and each of the entries is allocated to one of an architectural register and a renaming register.

The operation execution controller circuit issues a floating-point operation instruction and outputs a termination report of the floating-point operation before the floating-point operation is terminated by the arithmetic circuit.

When a setting is configured so that exception handling is not performed at the time of instruction completion when an exception is detected in the operation of the floating-point operation instruction, the instruction completion controller circuit outputs a release instruction that indicates a release of a renaming register when instruction execution is completed after the termination report is received.

The instruction decoder circuit receives the release instruction, allocates a first entry allocated to an architectural register that stores an execution result of the floating-point operation to a renaming register, and allocates a second entry allocated to a renaming register in the floating-point operation to the architectural register that stores the execution result of the floating-point operation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a configuration of a core of a CPU of a comparative example;

FIG. 6 is a diagram illustrating an example of a configuration of a floating-point physical register;

DESCRIPTION OF EMBODIMENTS

Figure 2:
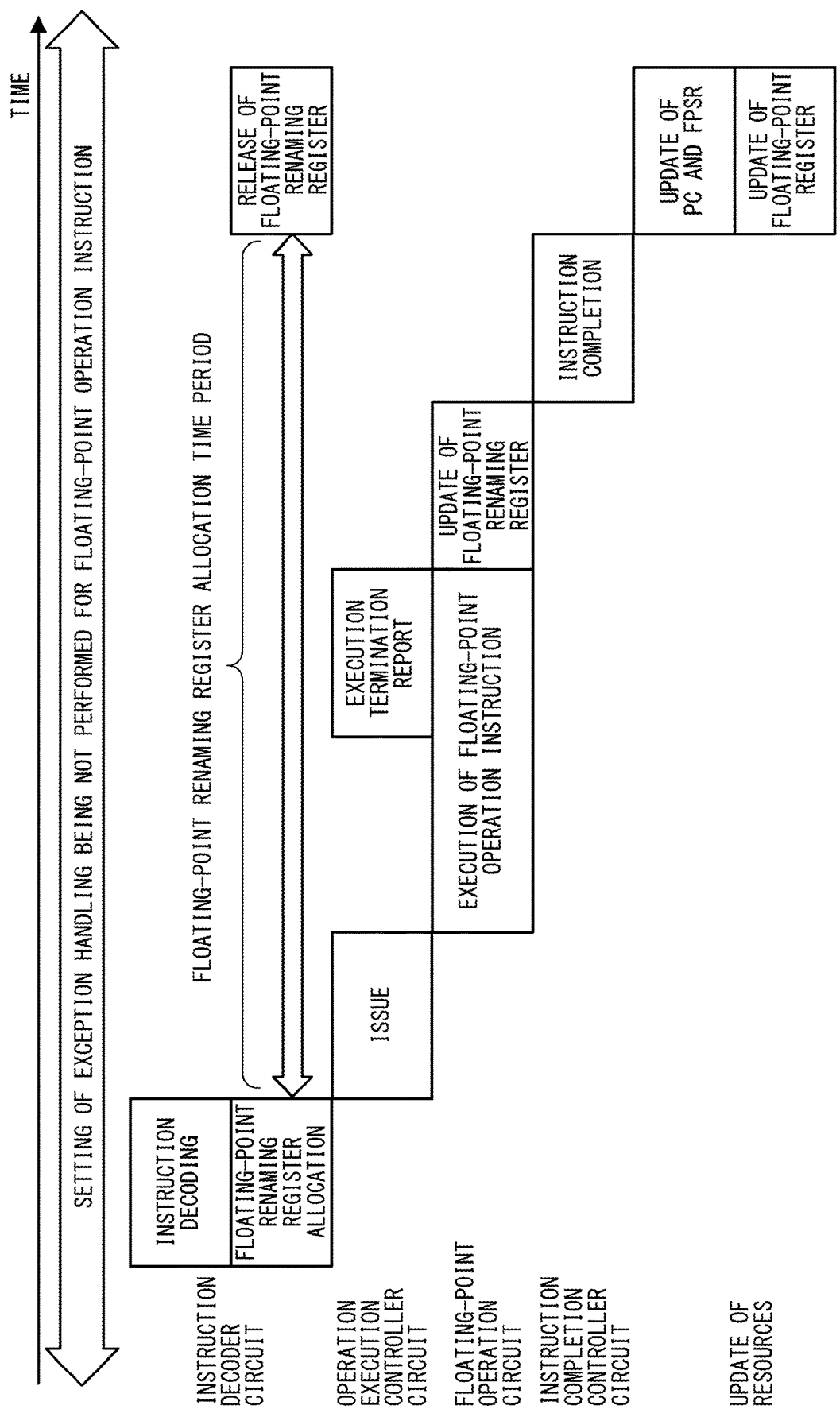
FIG. 2 is a diagram illustrating operations of a floating-point operation instruction in a comparative example.

In the following description, the embodiments are explained with reference to the drawings.

In high performance computing (HPC) applications, the setting may be configured by software so that exception handling is not performed at the time of instruction completion even when an exception (e.g., dividing by zero, overflow, or underflow) is detected at the time of operations of a floating-point operation instruction, in order to operate programs at high speed. For example, an ARM (Registered Trademark) architecture can mask the occurrence of each of exception handlings defined in a floating-point control register (FPCR). When the setting is configured so that exceptions of the floating-point operation instruction are all masked, more instructions that use a floating-point register are expected to be executed.

An arithmetic processor that can perform the out-of-order execution of instructions in a program allocates a floating-point renaming register to an instruction to store data in a floating-point register. Because a renaming register allocation takes place at the time of instruction decoding and the renaming register is released at the time of instruction completion, when execution takes a long time, time for the renaming register allocation also becomes long. A cause of the long execution time includes data dependencies between instructions. In a case of a program that uses many floating-point renaming registers, a shortage of the number of entries in the floating-point renaming register may occur. In the case of a shortage of renaming register, allocation of a new renaming register becomes difficult, causing instruction decoding to stop. When instruction decoding stops, instructions will not be provided to an instruction execution circuit, execution efficiency is decreased, resulting in performance degradation.

Next, an explanation of a comparative example is provided and afterwards the embodiments are explained.

FIG. 1 is a diagram illustrating a configuration of a core of a Central Processing Unit (CPU) of a comparative example.

CPU (not illustrated) includes multiple cores, and FIG. 1 illustrates a configuration of a core 11, which is one of the multiple cores.

The core 11 includes an instruction decoder circuit 21, an operation execution controller circuit 22, an instruction completion controller circuit 23, a floating-point operation circuit 24, a floating-point renaming register 25, a floating-point register 26, a floating-point control register (FPCR) 27, a floating-point status register (FPSR) 28, and a program counter (PC) 29.

The operation execution controller circuit 22 issues, to the floating-point operation circuit 24, an instruction in which operand data of a floating-point operation instruction is available. The issued instruction causes the operand data to be read out from the floating-point renaming register 25 or the floating-point register 26 and to be input to the floating-point operation circuit 24.

The floating-point operation circuit 24 starts executing operations, and when the execution of the operations terminates, the operation execution controller circuit 22 reports the termination of the execution of the operation instruction to the instruction completion controller circuit 23. At the time of termination of the operation execution, the floating-point operation circuit 24 stores the operation result in the floating-point renaming register 25. When an exception of the operation is detected, the floating-point operation circuit 24 reports the detection of an operation exception to the instruction completion controller circuit 23.

The instruction completion controller circuit 24 completes instructions in an order of the instructions in a program. When a floating-point operation instruction is completed, the instruction completion controller circuit 24 reads out the operation result from the floating-point renaming register 25 and stores the operation result in the floating-point register 26.

FIG. 2 is a diagram illustrating operations of a floating-point operation instructions in the comparative example.

In FIG. 2, an axis extending from left to right is a time axis. The setting is configured in the FPCR 27 so as not to perform exception handling at the time of instruction completion even when an exception is detected during the operation of a floating-point operation instruction.

The instruction decoder circuit 21 decodes a floating-point operation instruction and allocates an entry in the floating-point renaming register 25 as a renaming register.

The operation execution controller circuit 22 issues a floating-point operation instruction, and the floating-point operation circuit 24 starts executing the floating-point operation instruction.

When the execution of the floating-point operation instruction terminates, the operation execution controller circuit 22 sends an execution termination report to the instruction completion controller circuit 23. The floating-point operation circuit 24 stores the execution result of the floating-point operation instruction in the renaming register.

The instruction completion controller circuit 23 receives the execution termination report and carries out an instruction completion control. In the instruction completion control, the instruction completion controller circuit 23 instructs the instruction decoder circuit 21 to release the renaming register.

The instruction completion controller circuit 23 updates the FPSR 28 and the PC 29. The instruction completion controller circuit 23 reads out the execution result of the floating-point operation instruction from the renaming register and stores the execution result in the floating-point register 26 (update of the floating-point register). When the instruction decoder circuit 21 receives the instruction to release the renaming register, the instruction decoder circuit 21 releases the renaming register allocated as above.

Figure 3:
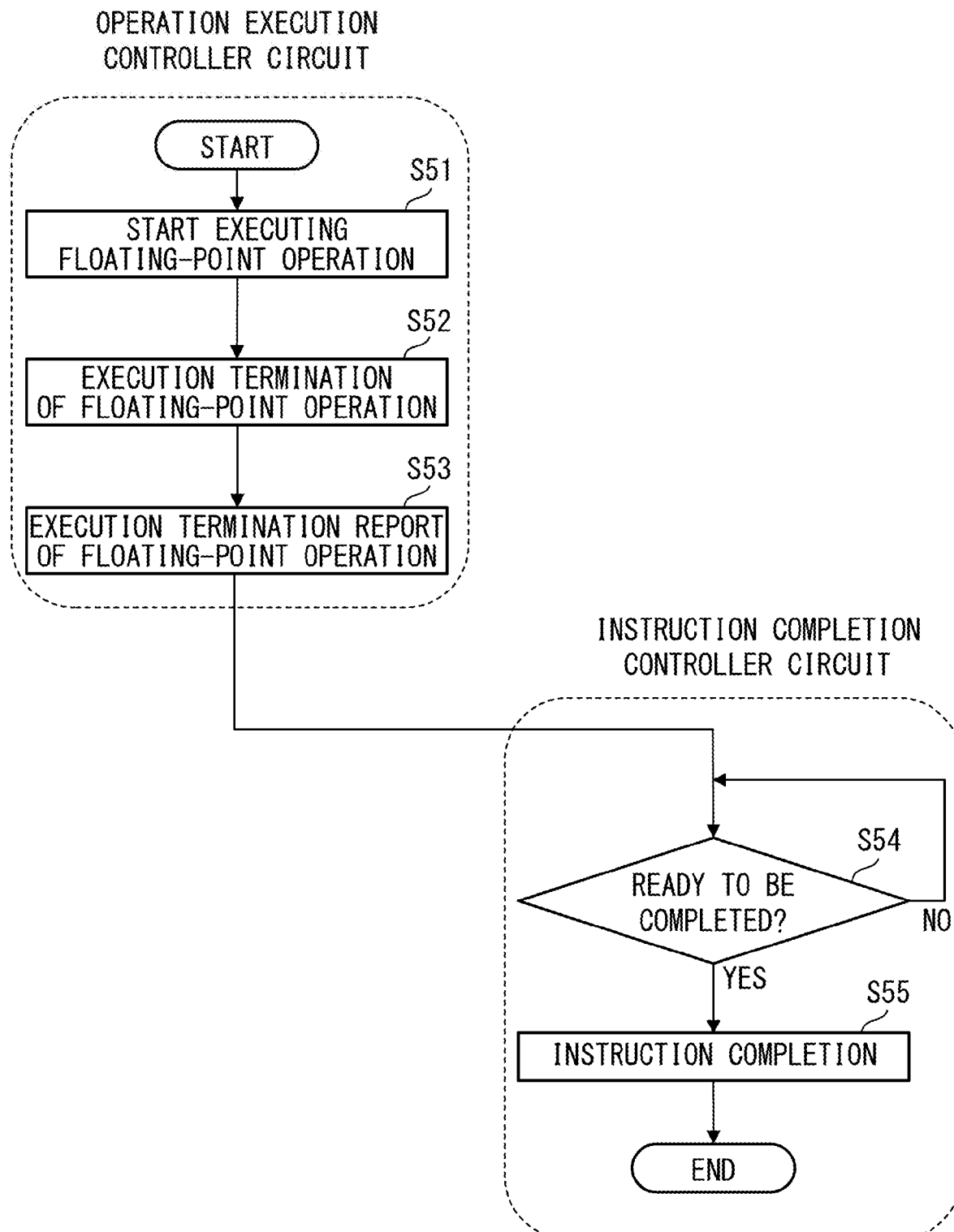
FIG. 3 is a flowchart of operations of floating-point operation completion in a comparative example.

FIG. 3 is a flowchart of operations of floating-point operation completion in the comparative example.

The operation execution controller circuit 22 issues a floating-point operation instruction to the floating-point operation circuit 24. The floating-point operation circuit 24 starts executing the floating-point operation instruction (step S51), and at the termination of execution of the floating-point operation instruction (step S52), the operation execution controller circuit 22 sends an operation termination report to the instruction completion controller circuit 23 (step S53).

The instruction completion controller circuit 23 checks whether the instruction is ready to be completed or not (step S54), and when the instruction is ready to be completed (step S54: YES), the instruction completion controller circuit 23 carries out an instruction completion control (step S55). Because the completion is carried out in an order of the instructions in a program, the instruction may sometimes not be ready to be completed (step S54: NO), and in such a case, processing is conducted to wait until the instruction is ready to be completed. At the time of instruction completion, the instruction completion controller circuit 23 updates resources (FPSR 28 and PC 29) and carries out release processing of the floating-point renaming register 25.

A possible method of solving a shortage of the floating-point renaming register 25 is an increase in the number of entries in the floating-point renaming register 25 or the reduction of the execution latency of a floating-point operation instruction. However, the increase in the number of entries in the floating-point renaming register 25 may possibly influence on CPU dimensions because a number of circuits are increased. The increase in CPU dimensions leads to an increase in costs. Meanwhile, the reduction of execution latency of an instruction may cause a decrease in frequency, resulting in performance degradation.

Figure 4:
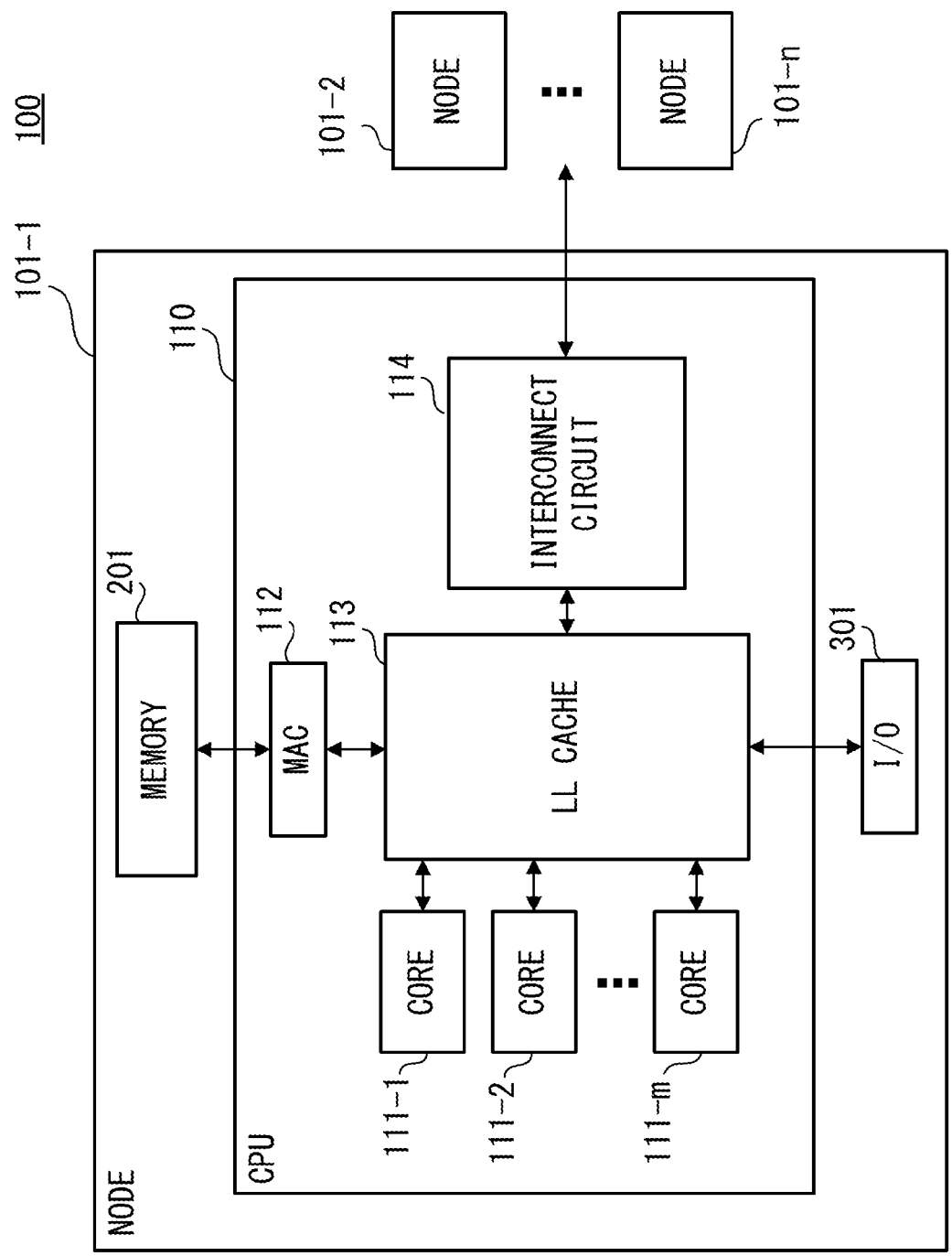
FIG. 4 is a diagram illustrating a configuration of a system according to the embodiments.

FIG. 4 is a diagram illustrating a configuration of a system according to the embodiments.

A system 100 has nodes 101-$i$ (i=1 to n). Each node 101-$i$ is coupled to at least one of the other nodes 101-$i$ and the coupled nodes can be communicated with each other.

The node 101-1 includes a CPU 110, a memory 201, and an Input/Output (I/O) 301. Note that the configuration of each of the nodes 101-2 to 101-$n$ is the same as the configuration of the node 101-1 and therefore the description is omitted.

The CPU 110 (processor) includes cores 111-$j$ (j=1 to m), a memory access controller (MAC) 112, a last level (LL) cache 113, and an interconnect circuit 114. The CPU 110 is an example of an arithmetic processor.

The cores 111-$j$ performs various arithmetic processing.

The MAC 112 controls read and write of the memory 201.

The LL cache 113 is a shared cache memory available to cores 111-$j$.

The interconnect circuit 114 is coupled to one or more nodes from among nodes 101-2 to 101-$n$ and transmits/receives data to/from the coupled nodes.

The memory 201 stores data and programs etc. used by the node 101-1. The CPU 110 reads and writes the data stored in the memory 201 and executes various processing.

The I/O 301 is an interface connected to internal or external devices (not illustrated) of the node 101-1.

Figure 5:
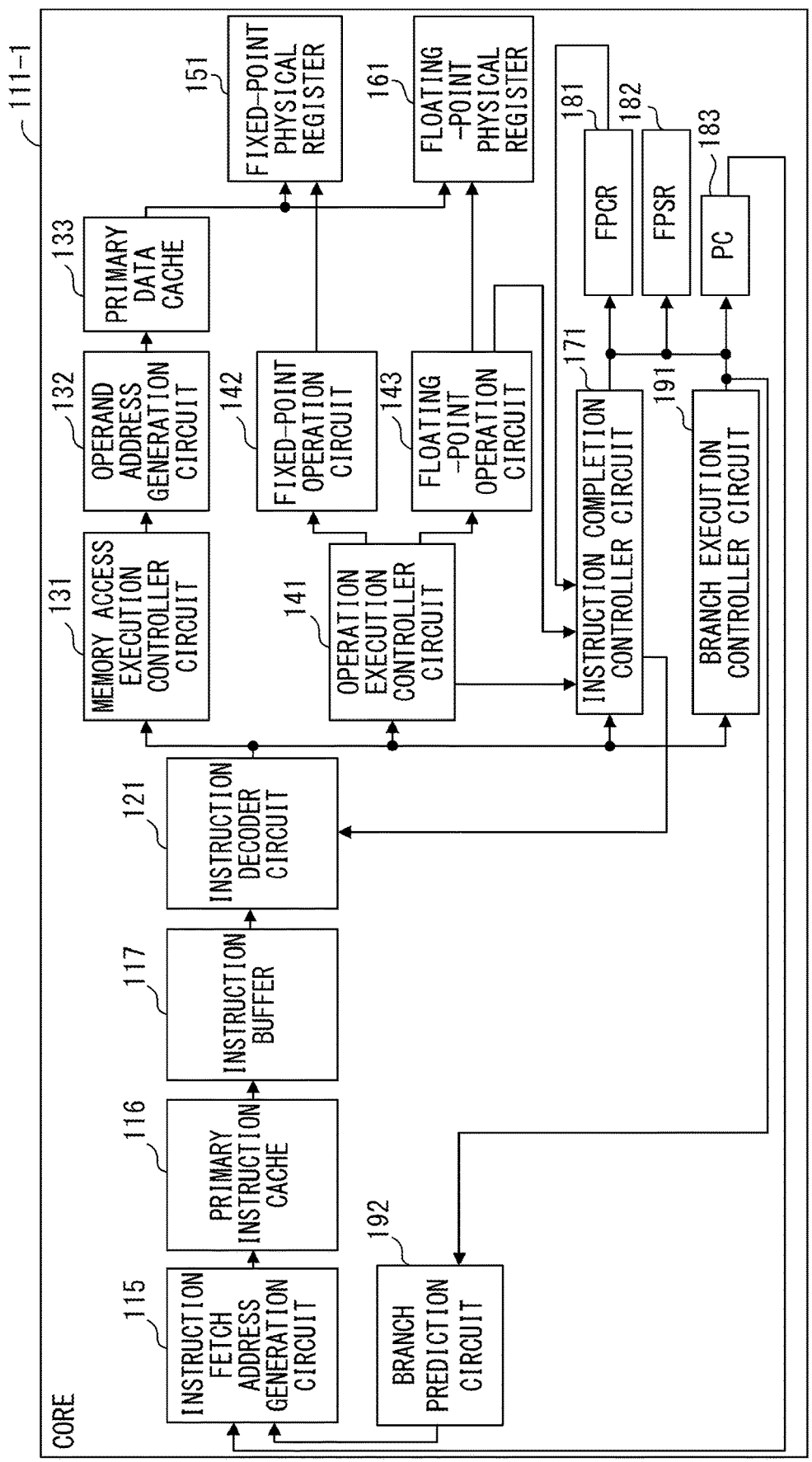
FIG. 5 is a diagram illustrating a configuration of a core according to the embodiments.

FIG. 5 is a diagram illustrating a configuration of a core according to the embodiments.

In FIG. 5, a configuration of the core 111-1 is illustrated. Note that the configuration of each of the cores 111-2 to 111-$m$ is the same as the configuration of the core 111-1 and therefore the description is omitted.

The core 111-1 includes an instruction fetch address generation circuit 115, a primary instruction cache 116, an instruction buffer 117, an instruction decoder circuit 121, a memory access execution controller circuit 131, an operand address generation circuit 132, a primary data cache 133, an operation execution controller circuit 141, a fixed-point operation circuit 142, a floating-point operation circuit 143, a fixed-point physical register 151, a floating-point physical register 161, an instruction completion controller circuit 171, an FPCR 181, an FPSR 182, a PC 183, a branch execution controller circuit 191, and a branch prediction circuit 192.

Each of the fixed-point physical register 151 and the floating-point physical register 161 employs a physical register system configured of architectural registers and renaming registers. In other words, the fixed-point physical register 151 and the floating-point physical register 161 are registers in which both renaming registers and architectural registers are present. In the physical register system, when an execution result is stored in a physical register, the execution result does not have to be transferred even at the time of the instruction completion.

In order to fetch an instruction, the instruction fetch address generation circuit 115 issues an instruction fetch request to a selected instruction address, and the instruction buffer 117 stores the instruction fetched from the primary instruction cache 116. The instruction buffer 117 supplies the instructions to the instruction decoder circuit 121 in an order of the instructions in a program, and the instruction decoder circuit 121 carries out decoding processing of the instructions in the order in the program and issues the instructions.

In accordance with the type of a decoded instruction, the instruction decoder circuit 121 creates an entry in the memory access execution controller circuit 131 that controls execution of the instructions, the operation execution controller circuit 141 that controls a fixed-point operation and a floating-point operation, and the branch execution controller circuit 191. For all of the decoded instructions, the instruction decoder circuit 121 creates an entry in a commit stack entry (CSE) included in the instruction completion controller circuit 171 that controls instruction completion. Each of the fixed-point physical register 151 and the floating-point physical register 161 that store the execution result is configured of architectural registers and renaming registers. A renaming register in the fixed-point physical register 151 may be referred to as a fixed-point renaming register. A renaming register in the floating-point physical register 161 may be referred to as a floating-point renaming register.

When an entry for the decoded instruction is created in each of the memory access execution controller circuit 131 and the operation execution controller circuit 141, the instruction decoder circuit 121 carries out register renaming processing that is register allocation allocating a register to the renaming register of the fixed-point physical register 151 and the renaming register of the floating-point physical register 161. In the operation execution controller circuit 141, by executing the instructions in an order from an instruction in which source operands used in the execution are available, the out-of-order execution can be carried out. The execution result is stored in the fixed-point renaming register and the floating-point renaming register allocated at the time of instruction decoding. For the instructions executed out-of-order by the operation execution controller circuit 141, the instruction completion is carried out in the order of instructions in the program by a control of the instruction completion controller circuit 171, and programmable resources such as PC are updated only for the completed instructions. In the physical register system in which both renaming registers and architectural registers are present, the instruction decoder circuit 121 changes the address of the physical register handled as a renaming register storing the operation result to an architectural register.

The instruction completion controller circuit 141 can complete the instructions in the original program order by completing the instructions from the oldest entry in the CSE. The instruction completion controller circuit 141 selects, from the CSE, entries of the maximum number of instructions that can be completed simultaneously in one cycle. The instruction completion controller circuit 141 handles the selected entries as entries in which the instructions are ready to be completed and performs a completion control. At the time of instruction decoding, an instruction ID (IID) for registering in the CSE is given. The IID is sent to the operation execution controller circuit 141, and when execution of the instruction is terminated, an execution termination report is stored in an entry in the CSE indicated by the IID. Consequently, executed instructions can be specified.

When an exception is detected at the time of operating a floating-point operation instruction, information indicating whether or not exception handling is performed at the time of completion of the instruction is set to the FPCR 181. Multiple exceptions are defined in the FPCR 181, and for each of the exceptions, whether exception handling is performed or is not performed at the time of completion of the instruction can be set by software.

As an example, the setting is configured so that the exception handling is not performed for all exceptions that can be defined in the FPCR 181. However, regardless of the setting in the FPCR 181, a fact that an operation exception was detected at the time of floating-point operation is stored in the FPSR 182 that is a special architectural register.

When an exception is detected at the time of operation of a floating-point operation instruction, a report of an operation exception being detected is sent from the floating-point operation circuit 143 to the instruction completion controller circuit 171 at the time at which execution of the floating-point operation instruction terminates. A report of an exception being detected is sent from the floating-point operation circuit 142 to the instruction completion controller circuit 171 after fixed cycles from a timing at which an operation termination report and an IID are sent from the operation execution controller circuit 141 to the instruction completion controller circuit 171. In this manner, the instruction completion controller circuit 171 can store, in an entry of the CSE, information of an exception being detected in the operation of the floating-point operation instruction. The instruction completion controller circuit 171, then, reads out the information of an exception being detected in the entry of the CSE and updates the FPSR 182 at the time of instruction completion. Because the FPSR 182 is updated at the time of instruction completion, the instruction completion controller circuit 171 updates the FPSR 182 at the same timing as the timing of a program counter etc.

FIG. 6 is a diagram illustrating an example of a configuration of a floating-point physical register.

The floating-point physical register 161 stores a floating-point number. The floating-point physical register 161 includes plural entries, and a physical register number that identifies each entry is assigned to each of the entries.

The floating-point physical register 161 includes architectural registers and renaming registers. Each entry in the floating-point physical register 161 is allocated to (set as) either an architectural register or a renaming register. Architectural registers or renaming registers to which entries are allocated can be changed by the instruction decoder circuit 121 as appropriate. An architectural register is a register that is visible from a program. A renaming register is a register that is invisible from a program and is a register that stores an execution result of an instruction executed by the hardware.

The entries in the floating-point physical register 161 other than those allocated to architectural registers are handled as renaming registers. Allocation to renaming registers is performed at the time of instruction decoding, and the renaming registers store instruction execution results. When the instructions are completed, the renaming registers become architectural registers. An entry of the floating-point physical register 161 handled as an architectural register before updating is handled as a renaming register after the updating.

A floating-point operation instruction issued by instruction decoding is registered in the operation execution controller circuit 141. When the operation execution controller circuit 141 determines data of source operands for executing the instruction to be available at an operation start timing, the operation execution controller circuit 141 issues an instruction and starts executing the operation. The operation execution is controlled by the operation execution controller circuit 141.

In FIG. 6, entries with physical register numbers being 0, 1, 3, and 77 are set as renaming registers, and entries with physical register numbers being 2, 75, and 76 are set as architectural registers.

Figure 7:
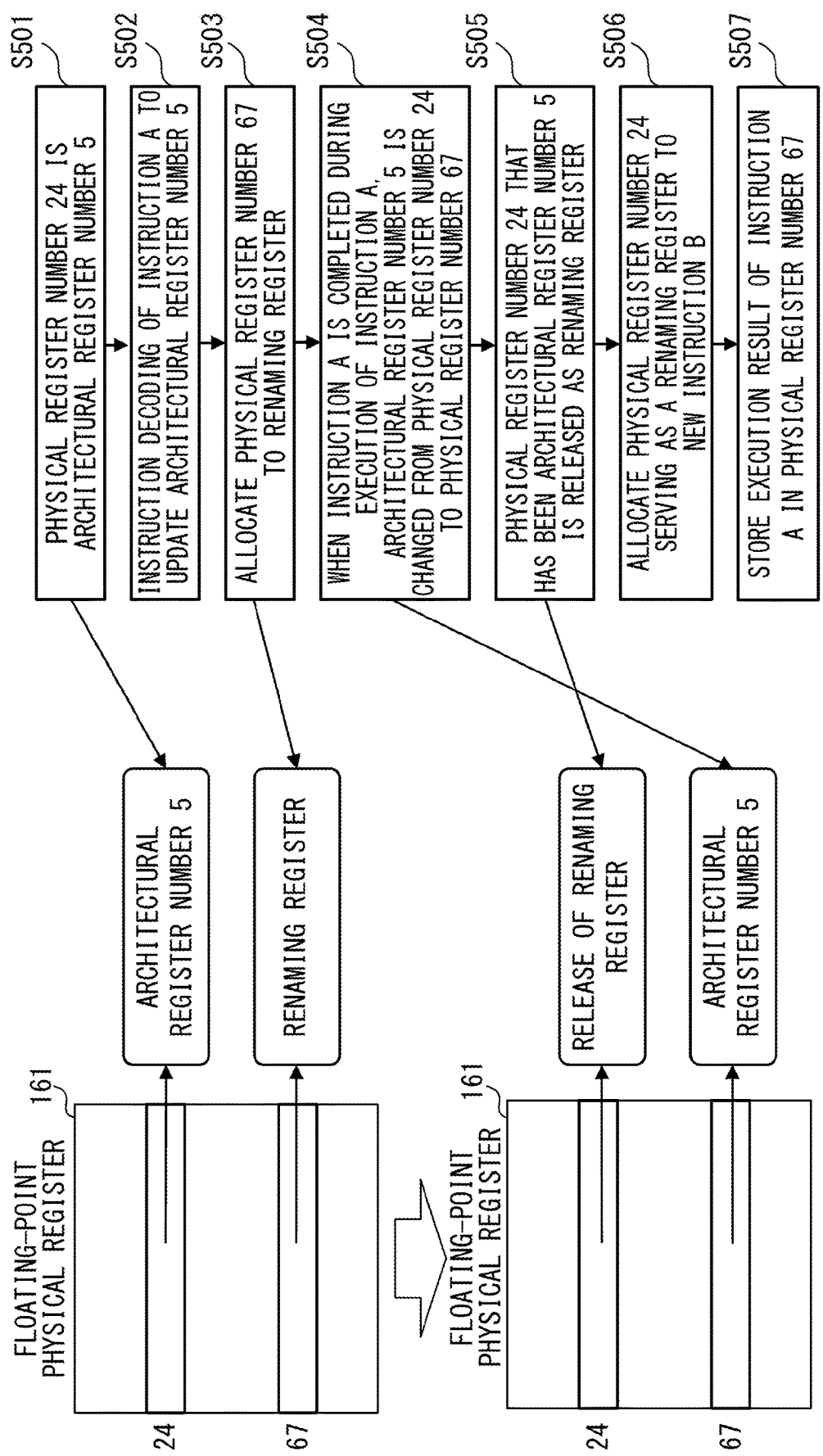
FIG. 7 is a diagram illustrating switching of an architectural register and a renaming register in a floating-point physical register.

FIG. 7 is a diagram illustrating switching of an architectural register and a renaming register in a floating-point physical register.

In the floating-point physical register 161, an entry with the physical register number being A is denoted as a physical register number A in FIG. 7.

In the floating-point physical register 161 illustrated in the upper left of FIG. 7, an entry with the physical register number being 24 (physical register number 24) in the floating-point physical register 161 is handled as an architectural register number 5 (step S501). At that time, the instruction decoder circuit 121 performs instruction decoding of a floating-point operation instruction A that updates the architectural register number 5 (step S502) and allocates a physical register number 67 as a renaming register (step S503).

The floating-point physical register 161 illustrated in the lower left of FIG. 7 depicts a state after switching between the architectural register and the renaming register. During the execution of the floating-point operation instruction A in the floating-point operation circuit 143, when the floating-point operation instruction A is completed, the instruction decoder circuit 121 allocates the physical register number 67 as the architectural register number 5 (step S504). Meanwhile, the physical register number 24 that has been the architectural register number 5 is released as a renaming register (step S505). The physical register number 24 is managed as an invalid register until the physical register number 24 is allocated as a new renaming register. Afterwards, when an instruction B that uses a renaming register is decoded, the instruction B is allocated to the physical register number 24 serving as a renaming register (step S506). After the completion of the instruction A, the execution result of the instruction A is stored in the physical register number 67 (step S507).

In a comparative example, when an architectural register and a renaming register are switched, after an execution result of an instruction A is stored in the physical register number 67 after completion of the instruction A, the physical register number 67 is allocated as the architectural register number 5 from a renaming register, and the physical register number 24 is released as a renaming register.

On the other hand, in the embodiments, the instruction A is completed during the execution of the instruction A (i.e., before execution of the instruction A is terminated), and the physical register number 24 that has been an architectural register number 5 is released as a renaming register. In other words, in the embodiments, the physical register number 24 is released as a renaming register earlier than that of the comparative example. As a result, in the embodiments, a shortage of the number of entries of a renaming register can be prevented.

Figure 8:
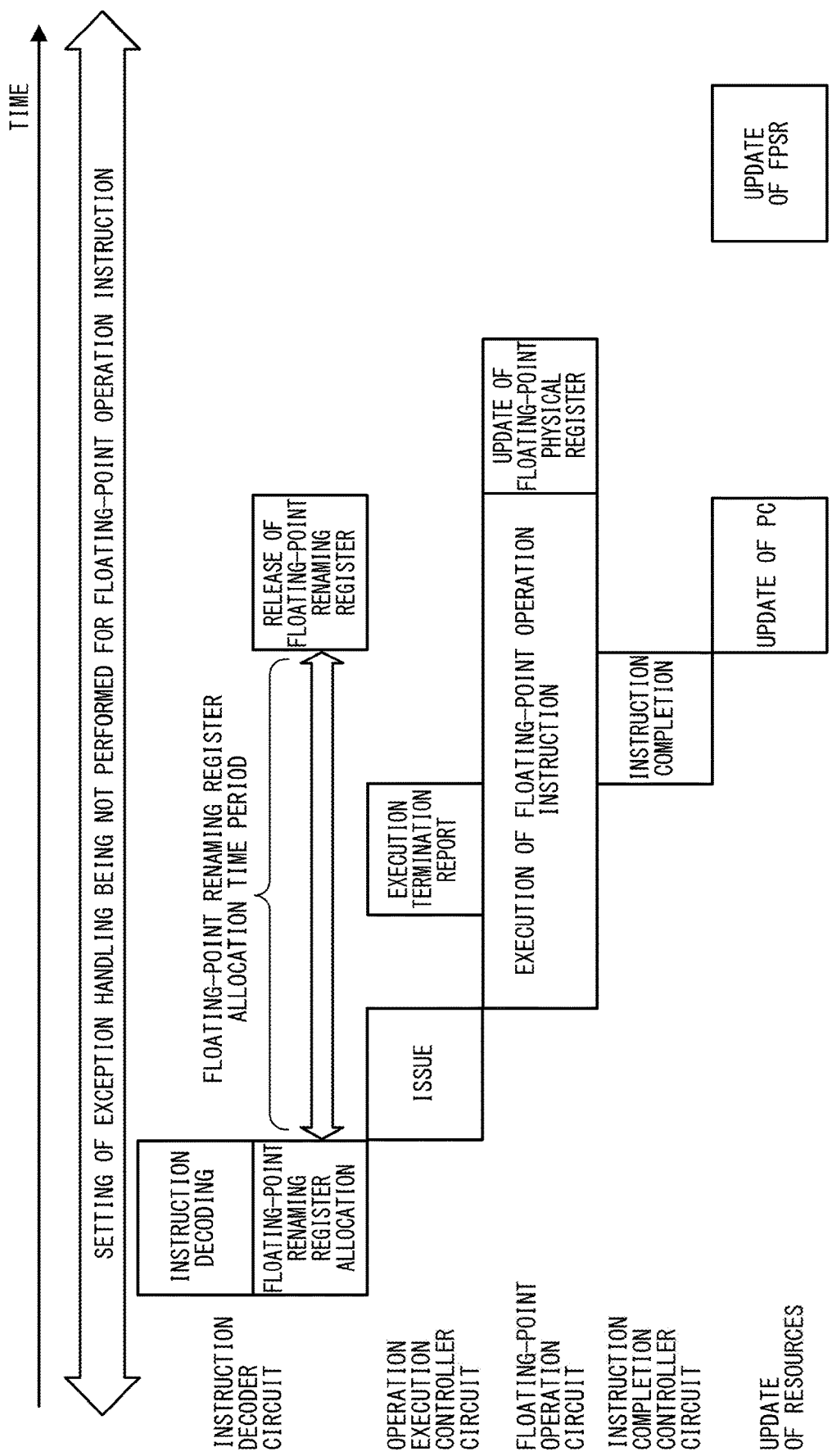
FIG. 8 is a diagram illustrating operations of a floating-point operation instruction according to the embodiments.

FIG. 8 is a diagram illustrating operations of the floating-point operation instruction according to the embodiments.

In FIG. 8, an axis extending from left to right is a time axis. In the FPCR 181, the setting is configured so that exception handling is not performed at the time of instruction completion even when an exception is detected at the time of operating a floating-point operation instruction. Similarly to FIG. 7, FIG. 8 describes a case in which the architectural register number 5 is updated in response to the floating-point operation instruction. Here, an entry with the physical register number being 24 (physical register number 24) in the floating-point physical register 161 is managed as the architectural register number 5.

The instruction decoder circuit 121 decodes a floating-point operation instruction and allocates the decoded instruction to the physical register number 67 in the floating-point physical register 161 to a renaming register.

The operation execution controller circuit 181 issues a floating-point operation instruction and the floating-point operation circuit 143 starts executing the floating-point operation instruction.

In the case in which the setting is configured so that exception handling is not performed at the time of instruction completion even when an exception is detected at the time of operating a floating-point operation instruction, the operation execution controller circuit 181 reports termination of execution of the floating-point operation instruction to the instruction completion controller circuit 171 at a timing at which after the floating-point operation instruction is completed and the architectural register is released as a renaming register, a condition is established in which an operation result of a subsequent instruction will not be stored in the entry of the renaming register in first. As a result, a floating-point operation instruction can be completed without waiting for execution termination of the instruction. For that reason, a timing to report the execution termination is different depending on operation latencies. The earliest timing of reporting the execution termination of a floating-point operation instruction is a timing at which data of source operands of the floating-point operation instruction to be executed is determined.

When execution of a floating-point operation instruction starts, the operation execution controller circuit 141 sends an execution termination report to the instruction completion controller circuit 171 without waiting for termination of operation execution. The instruction completion controller circuit 171 receives the execution termination report and checks whether the instruction is ready to be completed. In the case in which the instruction is ready to be completed, the instruction completion controller circuit 171 carries out an instruction completion control at the time at which the setting is configured so that exception handling is not performed at the time of instruction completion even when an exception is detected at the time of operation of a floating-point operation instruction. When instruction completion is determined in the instruction completion control, the instruction completion controller circuit 171 outputs a release instruction that indicates a release of a renaming register to the instruction decoder circuit 121. The instruction completion controller circuit 171 updates the PC 183.

When the setting is configured so that exception handling is performed for an operation exception of a floating-point operation instruction, the instruction completion controller circuit 171 carries out a control to stop instruction completion until operation termination because the operation exception can be sent from the floating-point operation circuit. When a period of time to stop instruction completion has elapsed, by carrying out the instruction completion control, the same operations of instruction completion as that of the comparative example are performed when the setting is configured so that operation exception handling is performed.

The instruction decoder circuit 121, when receiving a release instruction from the instruction completion controller circuit 171, releases, as a renaming register, the physical register number 24 that is the architectural register number 5 to be updated in the floating-point operation instruction. The instruction decoder circuit 121 also allocates the physical register number 67 that has been allocated as a renaming register as the architectural register number 5.

The floating-point operation circuit 143 stores the execution result of the floating-point operation instruction in the physical register number 67 that is newly allocated as the architectural register number 5 (update of the floating-point physical register).

When the setting is configured so that exception handling is not performed at the time of instruction completion when an exception is detected at the time of operating a floating-point operation instruction, information of an operation exception being detected is stored in the FPSR 182 at the time of completion of the floating-point operation instruction. The exception in the operation of a floating-point operation instruction is detected by floating-point operation circuit 143 at the time at which the operation is terminated and is reported to the instruction completion controller circuit 171. In this case, because the operation exception of the floating-point operation instruction is reported after the floating-point operation instruction is completed, the FPSR 182 is not updated at the time of completion of the floating-point operation instruction. For that reason, a control is carried out so that a timing at which the instruction completion controller circuit 171 updates the FPSR 182 with information of an exception being detected in operation of a floating-point operation instruction comes later than a timing of instruction completion. Because the FPSR 182 that stores the information of an exception being detected in operation of a floating-point operation instruction is not subject to the register renaming process, to read out the FPSR 182, the reading processing is carried out after all instructions are completed. However, since the update timing of the FPSR 182 that stores the information of an exception being detected occurs later than the instruction completion, when the FPSR 182 is to be read out, the readout is controlled to be started after the update of the FPSR 182 is completed.

Figure 9:
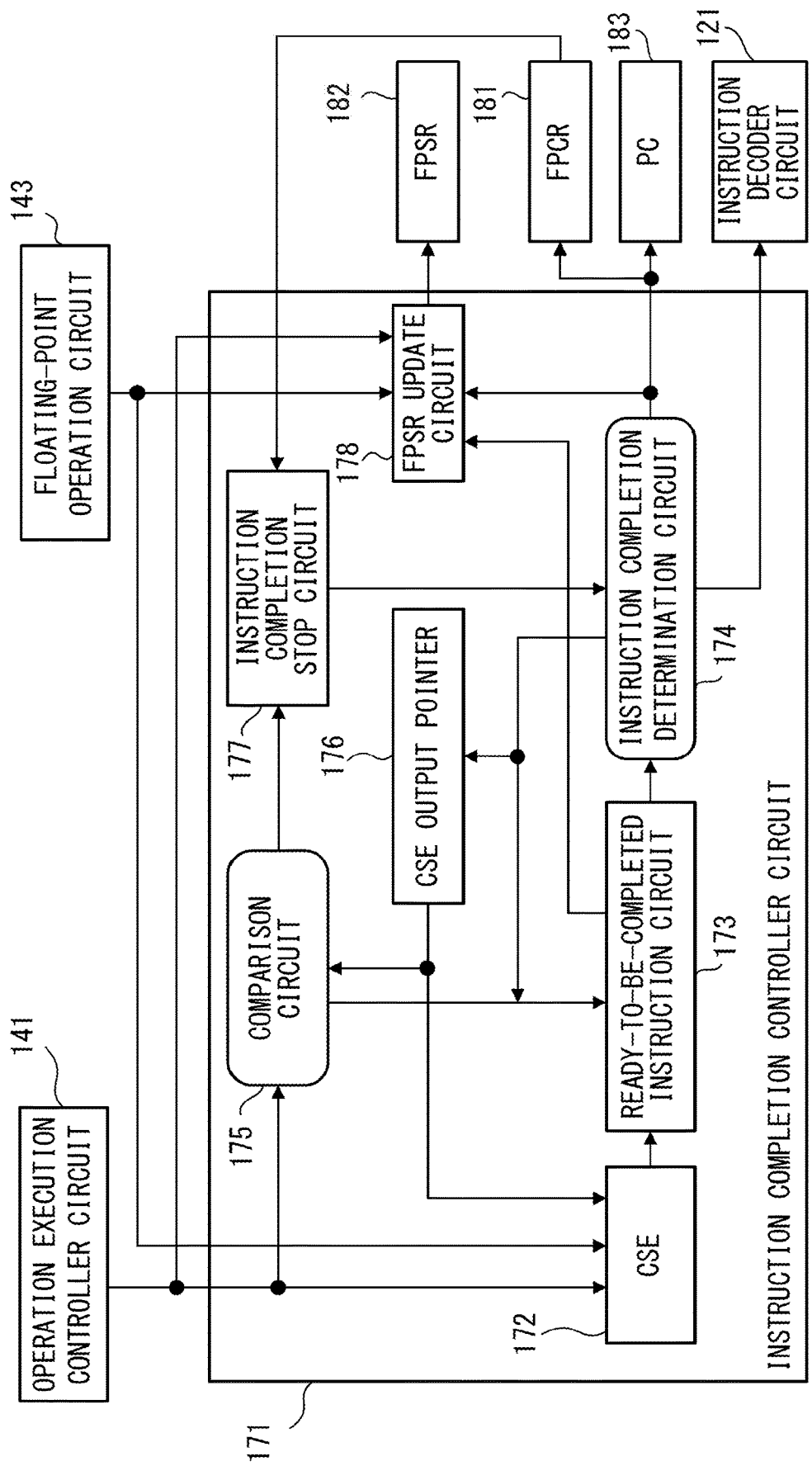
FIG. 9 is a diagram illustrating details of a configuration of an instruction completion controller circuit.

FIG. 9 is a diagram illustrating details of a configuration of an instruction completion controller circuit.

The instruction completion controller circuit 171 includes a CSE 172, a ready-to-be-completed instruction circuit 173, an instruction completion determination circuit 174, a comparison circuit 175, a CSE output pointer 176, an instruction completion stop circuit 177, and a FPSR update circuit 178.

The CSE 172 stores information indicating a decoded instruction in an entry indicated by IID. The CSE 172 outputs, to the ready-to-be-completed instruction circuit 173, information indicating the maximum number of instructions that can be completed simultaneously in one cycle from an entry number indicated by the CSE output pointer 176.

As an example, the operation execution controller circuit 141 causes a timing to report execution termination of a floating-point operation instruction to the instruction completion controller circuit 171 to occur in a cycle following a cycle in which data of source operands is determined. In the case in which the setting is configured in the FPCR 181 so that exception handling is not performed at the time of instruction completion even when an exception is detected in the floating-point operation, the instruction completion controller circuit 171 carries out a completion control of an instruction at the earliest timing when the instruction for which an operation termination report is received from the operation execution controller circuit 141 can be completed.

However, in the case in which the setting is configured in the FPCR 181 so that exception handling is performed at the time of instruction completion when an exception is detected in the floating-point operation, an exception may be detected even when the instruction can be completed. For that reason, the instruction completion controller circuit 171 carries out a control to stop instruction completion in a time period in which there is a possibility of an exception being sent to the instruction completion controller circuit 171 after the operation instruction is terminated.

The operation execution controller circuit 141 sends information indicating a latency of an operation instruction together with IID to the instruction completion controller circuit 171 at the time of an operation termination report, and the instruction completion controller circuit 171 uses the information for determination of whether to stop instruction completion.

The comparison circuit 175 compares an output of the CSE output pointer 176 indicating an IID of a ready-to-be-completed instruction with an IID sent with the execution termination report from the operation execution controller circuit 141 and checks whether the IID is of an operation instruction that is ready to be completed in the next cycle. When the output from the CSE output pointer 176 matches the IID from the operation execution controller circuit 141, the IID is an IID of an operation instruction that is ready to be completed in the next cycle. The comparison circuit 175 outputs the comparison result to the ready-to-be-completed instruction circuit 173 and the instruction completion stop circuit 177.

Based on the output (comparison result) of the comparison circuit 175, the ready-to-be-completed instruction circuit 173 notifies the instruction completion determination circuit 174 and the FPSR update circuit 178 of the instruction that is ready to be completed in the next cycle. When the comparison result indicates the IID match, the ready-to-be-completed instruction circuit 173 notifies the instruction completion determination circuit 174 and the FPSR update circuit 178 of the IID of the instruction that is ready to be completed in the next cycle.

In a case of an instruction that is ready to be completed in the next cycle, when the setting is configured in the FPSCR 181 so that exception handling is not performed at the time of instruction completion even when an exception is detected in a floating-point operation, the instruction completion determination circuit 174 carries out an instruction completion control in the next cycle. In the instruction completion control, the instruction completion determination circuit 174 outputs, to the instruction decoder circuit 121, a release instruction that indicates release of a renaming register.

Meanwhile, the instruction completion stop circuit 177 outputs to the instruction completion determination circuit 174 a control signal to stop the instruction completion control in the next cycle when the setting is configured in the FPSCR 181 so that exception handling is performed at the time of instruction completion when an exception is detected in a floating-point operation. At that time, the instruction completion control can be carried out for instructions before this floating-point operation instruction. Based on the latency of the operation instruction sent with the execution termination report and the IID from the operation execution controller circuit 141, the instruction completion stop circuit 177 determines a period of time in which the instruction completion control is stopped, and continues to output the control signal to stop the instruction completion control to the instruction completion determination circuit 174 in the determined period of time.

Figure 10:
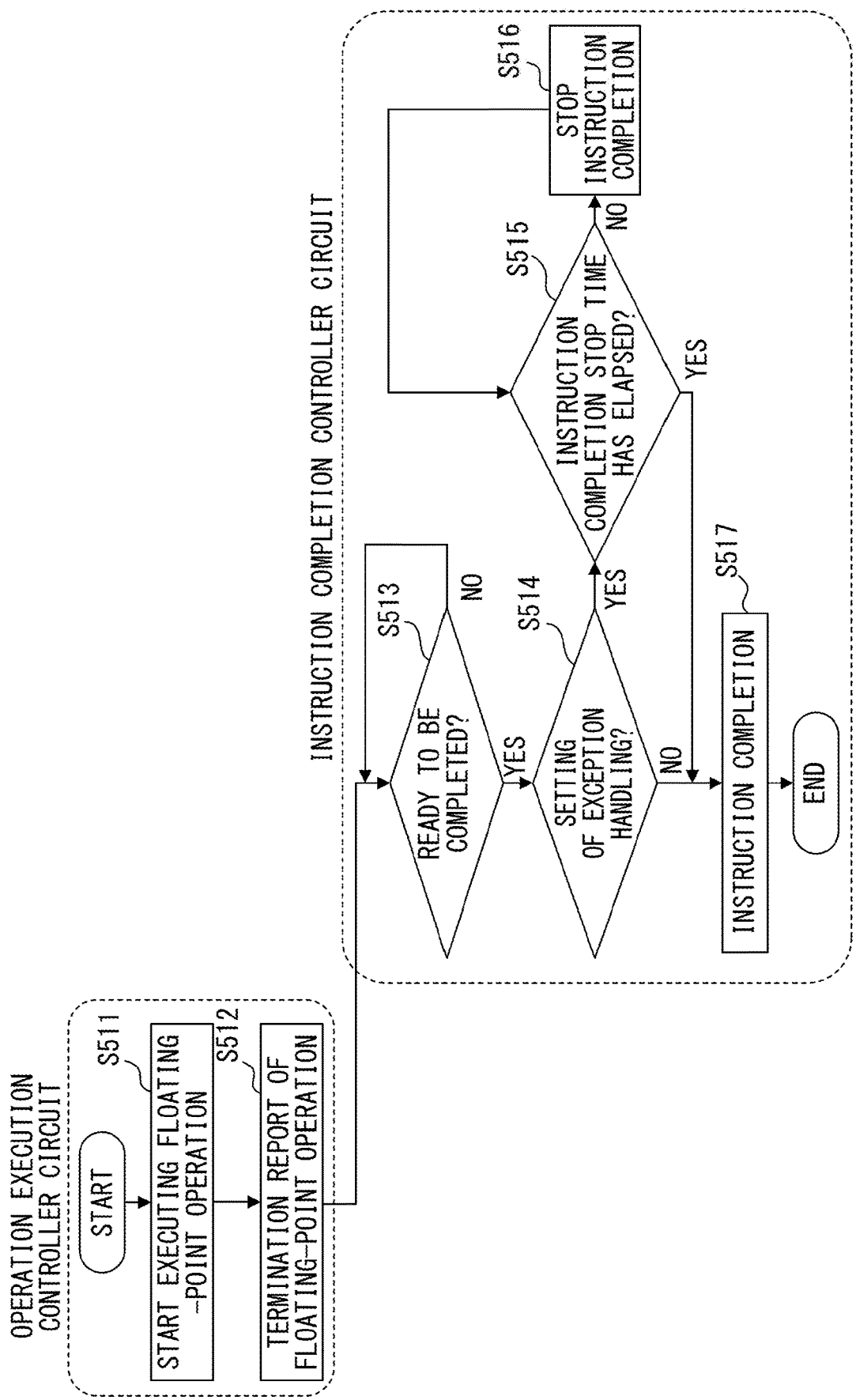
FIG. 10 is a flowchart of operations for floating-point operation instruction completion according to the embodiments.

FIG. 10 is a flowchart of operations for floating-point operation instruction completion according to the embodiments.

The operation execution controller circuit 141 issues an instruction to start executing a floating-point operation, and the floating-point operation circuit 143 starts the floating-point operation (step S511). The operation execution controller circuit 141 sends an operation termination report to the instruction completion controller circuit 171 before the floating-point operation is terminated by the floating-point operation circuit 143 (step S512).

The instruction completion controller circuit 171 receives the operation termination report sent from the operation execution controller circuit 141 and determines whether or not the floating-point operation instruction of the operation termination report is ready to be completed in the next cycle (step S513). More specifically, the instruction completion controller circuit 171 compares the IID of the operation instruction received from the operation execution controller circuit 141 with an output of the CSE output pointer 176 indicating an IID of a ready-to-be-completed instruction and determines whether or not the floating-point operation instruction of the operation termination report is ready to be completed in the next cycle. When the floating-point operation instruction is ready to be completed (step S513: YES), the instruction completion controller circuit 171 determines whether a setting is configured in the FPCR 181 to perform exception handling when an exception is detected in the floating-point operation (step S514).

When the setting is configured in the FPCR 181 so that exception handling is not performed even when an exception is detected in the floating-point operation (step S514: NO), the instruction completion controller circuit 171 carries out an instruction completion control in the next cycle, and the instruction is completed (step S517). In the instruction completion control, the instruction completion controller circuit 171 instructs release of a renaming register to the instruction decoder circuit 121. When receiving the instruction, the instruction decoder circuit 121 releases renaming registers. In other words, the instruction decoder circuit 121 changes, to a renaming register, an entry of the floating-point physical register 161 allocated to an architectural register to be updated in a floating-point operation.

When the setting is configured in the FPCR 181 so that exception handling is performed when an exception is detected in the floating-point operation (step S514: YES), the instruction completion controller circuit 171 determines whether or not a prescribed period of stop time has elapsed since the reception of the operation termination report (step S515). When the prescribed period of stop time has not yet elapsed (step S515: NO), the instruction completion controller circuit 171 stops the instruction completion (step S516). In other words, because an operation exception may possibly be sent from the floating-point operation circuit 143, the instruction completion controller circuit 171 stops the instruction completion in a time period in which there is a possibility of an operation exception being sent.

Based on the latency of the operation instruction sent with a termination report of an operation instruction from the operation execution controller circuit 141, a time period in which an operation exception may possibly be sent from the operation circuit to the instruction completion controller circuit 171 can be determined. The instruction completion controller circuit 171 uses the latency of the operation instruction sent from the operation execution controller circuit 141 as the prescribed period of stop time.

When the prescribed period of stop time in which instruction completion is stopped has elapsed (step S515: YES), or in other words, when the time period in which an operation exception may possibly be sent from the floating-point operation circuit 143 is terminated, the instruction completion controller circuit 171 carries out instruction completion (step S517). At that time, when an operation exception has been sent from the floating-point operation circuit 143, the instruction completion controller circuit 171 performs exception handling. When an operation exception has not been sent from the floating-point operation circuit 143, the instruction completion controller circuit 171 carries out an instruction completion control in the next cycle.

Figure 11:
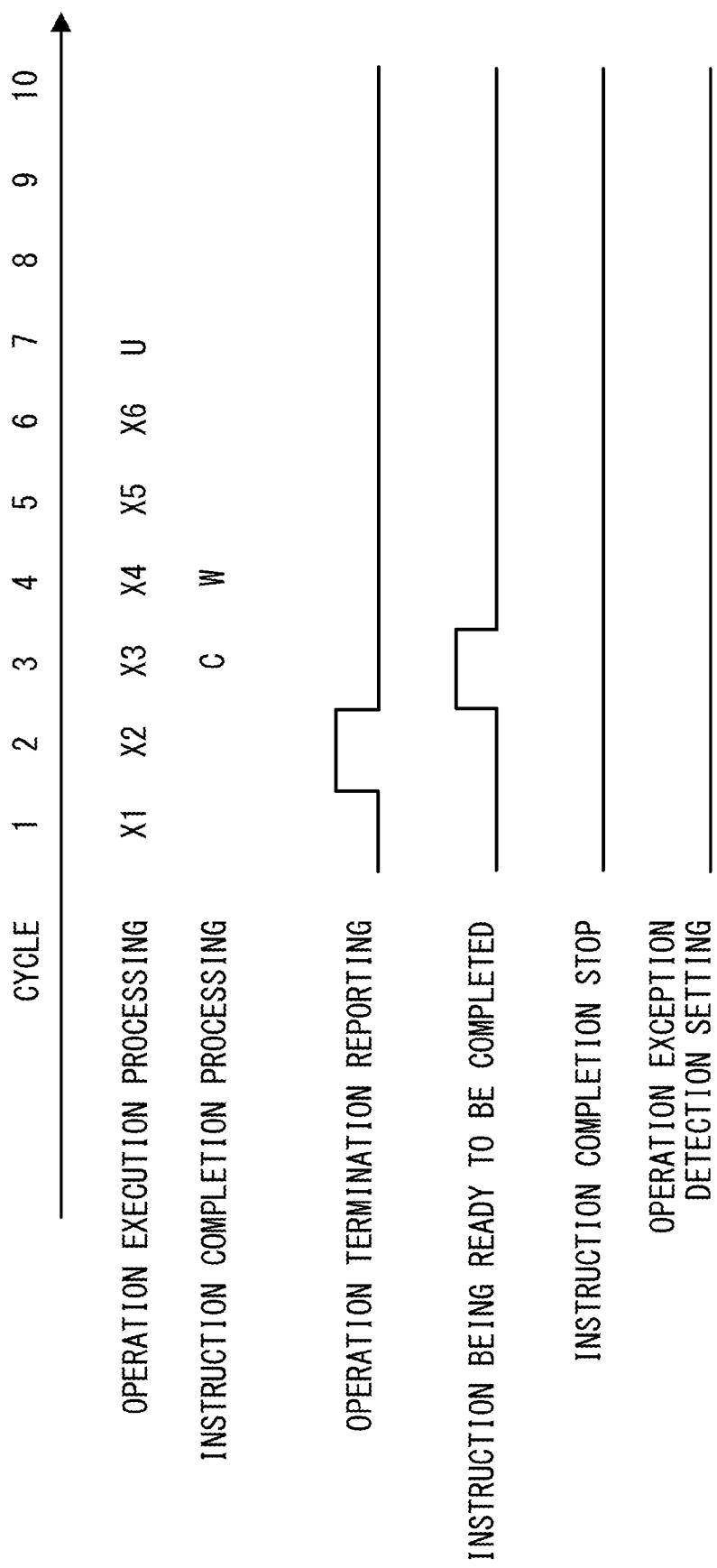
FIG. 11 is a timing chart of operations for instruction completion when a setting is configured so that exception handling is not performed even when an exception is detected in a floating-point operation.

FIG. 11 is a timing chart of operations for instruction completion when the setting is configured so that exception handling is not performed even when an exception is detected in a floating-point operation.

FIG. 11 provides from the top, cycle, operation execution processing, instruction completion processing, operation termination reporting, instruction being ready to be completed, instruction completion stop, and operation exception detection setting.

In FIG. 11, because the setting is configured so that exception handling is not performed even when an exception is detected in a floating-point operation, the operation exception detection setting and instruction completion stop are at an L (Low) level.

FIG. 11 illustrates operations carried out when a floating-point operation instruction with a 6-cycle latency is completed within the earliest possible period of time from an operation start. X1 to X6 (cycles 1 to 6) indicate execution of floating-point operations by the floating-point operation circuit 143. When X1 is established, operand data of the operation becomes available. The operation execution controller circuit 141 sends an operation termination report to the instruction completion controller circuit 171 in X2 (cycle 2). At the same time as the operation termination report, the operation execution controller circuit 141 also sends the IID of the operation instruction and information of the operation latency being 6 cycles to the instruction completion controller circuit 171. When the instruction of the operation termination report is ready to be completed in the next cycle, the instruction completion controller circuit 171 carries out an instruction completion control (C: cycle 3) and resource update (W: cycle 4). When the operation is terminated, the floating-point operation circuit 143 updates the floating-point physical register 161 (U: cycle 7).

It is noted that when any instruction before the floating-point operation instruction has not been completed, such an instruction is not ready to be completed. In this case, the instruction completion controller circuit 171 waits until the instruction becomes ready to be completed.

Figure 12:
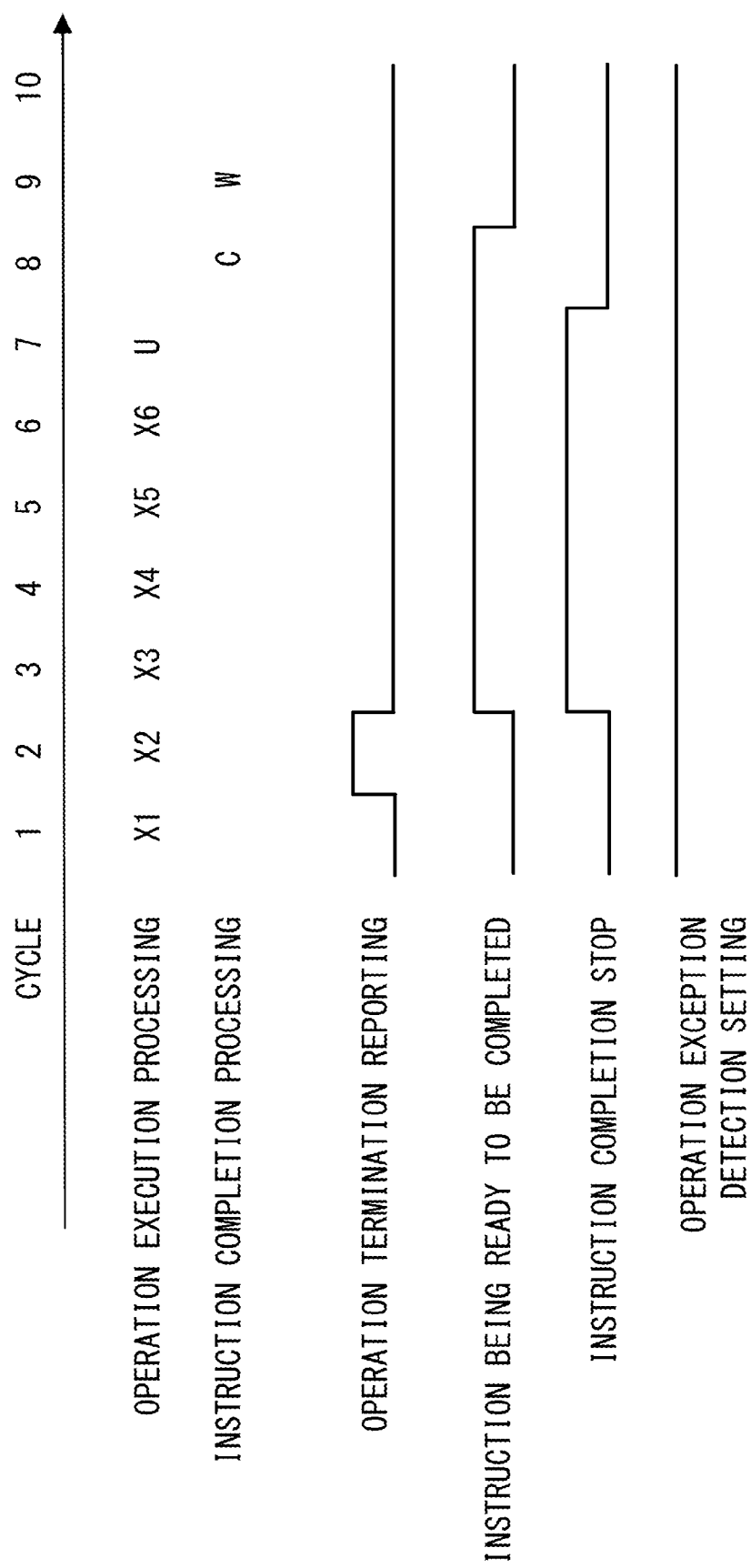
FIG. 12 is a timing chart of operations for instruction completion when the setting is configured so that exception handling is performed when an exception is detected in a floating-point operation.

FIG. 12 is a timing chart of operations for instruction completion when the setting is configured so that exception handling is performed when an exception is detected in a floating-point operation.

FIG. 12 provides from the top, cycle, operation execution processing, instruction completion processing, operation termination reporting, instruction being ready to be completed, instruction completion stop, and operation exception detection setting.

In FIG. 12, because the setting is configured so that exception handling is performed when an exception is detected in a floating-point operation, the operation exception detection setting is at an H (High) level.

FIG. 12 illustrates operations carried out when a floating-point operation instruction with a 6-cycle latency is completed within the earliest possible period of time from an operation start. The timing at which information is sent from the operation execution controller circuit 141 to the instruction completion controller circuit 171 and the information are the same as those in FIG. 11. When an instruction of an operation termination report is ready to be completed in the next cycle, the instruction completion controller circuit 171 carries out a control to stop instruction completion until the update of the floating-point physical register 161 (U: cycle 7) until which an operation exception may possibly be sent from the floating-point operation circuit 143 to the instruction completion controller circuit 171. In other words, an output (instruction completion stop) of the instruction completion stop circuit 177 is at an H level. Because the latency of the operation instruction is 6 cycles, a period of time to stop instruction completion is 5 cycles (cycle 3 to cycle 7). When the period of time to stop instruction completion terminates, the instruction completion controller circuit 171 carries out an instruction completion control (C: cycle 8). At that time, when an operation exception is sent from the floating-point operation circuit 143, the instruction completion controller circuit 171 detects the operation exception. The instruction completion controller circuit 171 updates resources (W: cycle 9).

Figure 13:
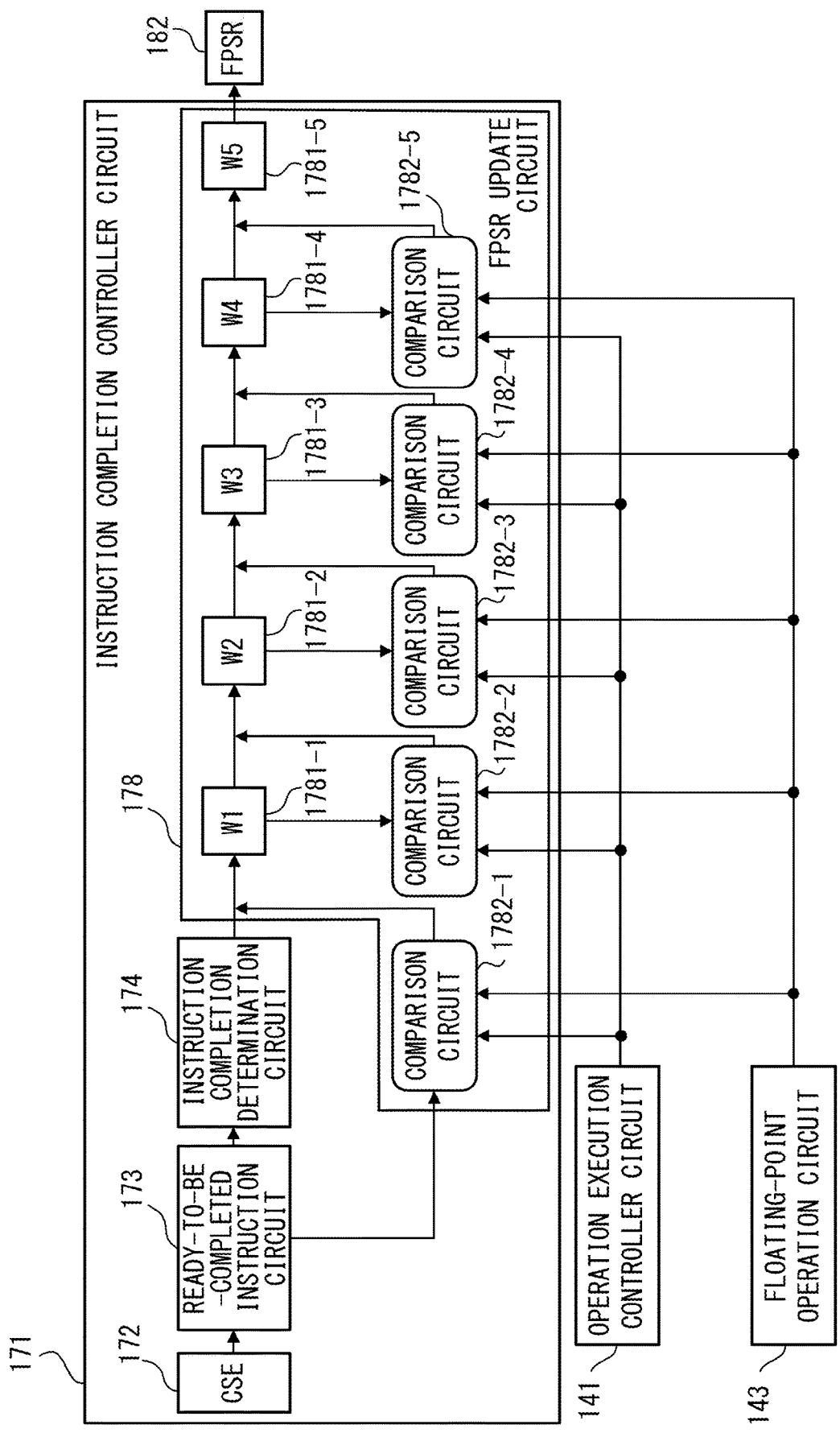
FIG. 13 is a diagram illustrating details of a configuration of a FPSR update circuit.

FIG. 13 is a diagram illustrating details of a configuration of the FPSR update circuit.

FIG. 13 illustrates a case of a floating-point operation instruction with a 6-cycle latency.

The FPSR update circuit 178 includes flip-flops 1781-$k$ ($k$=1 to 5) and comparison circuits 1782-$k$. Note that the flip-flops 1781-1 to 1781-5 may be denoted as W1 to W5, respectively.

The flip-flops 1781-1 to 1781-4 output data stored in each of these flip-flops to the flip-flops 1781-2 to 1781-5, respectively, in each cycle. The flip-flops 1781-$k$ store input data. When an operation exception is received, the flip-flop 1781-5 stores information of an operation exception being detected in the FPSR 182. The flip-flops 1781-1 to 1781-4 also output data stored in each of these flip-flops to the comparison circuits 1782-2 to 1782-5, respectively, in each cycle.

To the comparison circuit 1782-1, an IID of a ready-to-be-completed instruction (i.e., an IID indicated by an output of the CSE output pointer 176) is input from the ready-to-be-completed instruction circuit 173. To the flip-flop 1781-1, an IID of a ready-to-be-completed instruction is input from the instruction completion determination circuit 174. To the comparison circuits 1782-2 to 1782-5, an IID of a ready-to-be-completed instruction (i.e., an IID indicated by an output of the CSE output pointer 176) is input from the flip-flops 1781-1 to 1781-4.

When a floating-point operation by the floating-point operation circuit 143 is terminated, the operation execution controller circuit 141 sends an execution termination report and an IID again to the instruction completion controller circuit 171. The IID output from the operation execution controller circuit 141 is input to the comparison circuits 1782-$k$.

When an operation exception occurs, the floating-point operation circuit 143 sends the operation exception to the comparison circuits 1782-$k$ in the instruction completion controller circuit 171.

The comparison circuits 1782-$k$ compares an IID of a ready-to-be-completed instruction (i.e., an IID indicated by an output of the CSE output pointer 176) with an IID sent from the operation execution controller circuit 141. When the IIDs match, the comparison circuits 1782-$k$ capture a signal of the operation exception from the floating-point operation circuit 143 (operation exception capture) and output the operation exception.

In the case in which the setting is configured in the FPCR 181 so that exception handling is not performed even when an exception is detected in the floating-point operation, when a timing of completion of the floating-point operation instruction is too early, the instruction may be completed before an exception of the floating-point operation instruction is sent from the floating-point operation circuit 143 to the instruction completion controller circuit 171. It is desirable to update the FPSR 182 that stores information of an exception being detected, regardless of the setting in the FPCR 181, when the exception is detected in the floating-point operation.

However, when the instruction is completed without waiting for execution termination of the floating-point operation instruction, update of the FPSR 182 is not performed in a correct manner. For that reason, by allowing the FPSR update circuit 178 to update the FPSR 182 after instruction completion, the update of the FPSR 182 can be performed in a correct manner.

When a floating-point operation by the floating-point operation circuit 143 is terminated, the operation execution controller circuit 141 sends an execution termination report and an IID again to the instruction completion controller circuit 171. The IID output from the operation execution controller circuit 141 is input to the comparison circuits 1782-$k$. When an operation exception occurs, the floating-point operation circuit 143 sends the operation exception to the comparison circuits 1782-$k$ in the instruction completion controller circuit 171. From a timing of instruction completion, the comparison circuits 1782-$k$ compares an IID of a ready-to-be-completed instruction from the ready-to-be-completed instruction circuit 173 with an IID sent from the operation execution controller circuit 141. When the IIDs match, the comparison circuits 1782-$k$ capture a signal of the operation exception from the floating-point operation circuit 143 (operation exception capture) and output the operation exception. Consequently, the FPSR 182 can be updated after instruction completion.

Figure 14:
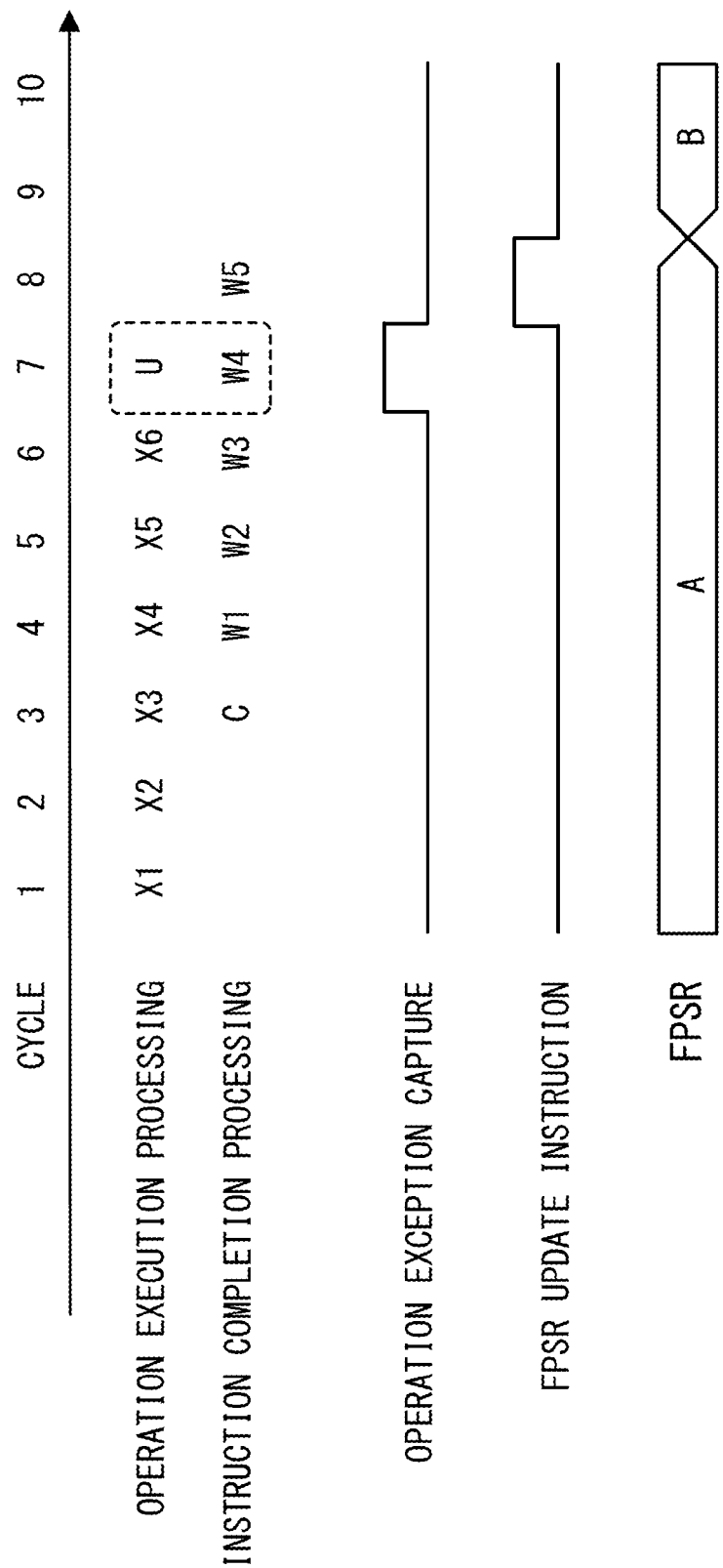
FIG. 14 is a timing chart of operations for updating FPSR.

FIG. 14 is a timing chart of operations for updating FPSR.

FIG. 14 provides from the top, cycle, operation execution processing, instruction completion processing, operation exception capture, FPSR update instruction and FPSR.

FIG. 14 illustrates operations carried out when a floating-point operation instruction with a 6-cycle latency is completed within the earliest possible period of time from an operation start. FIG. 14 illustrates operation to update the FPSR 182 after instruction completion of a floating-point operation instruction when the setting is configured in the FPCR 181 so that exception handling is not performed even when an exception is detected in the floating-point operation.

X1 to X6 (cycles 1 to 6) indicate execution of floating-point operations by the floating-point operation circuit 143. When X1 is established, operand data of the operation becomes available. The operation execution controller circuit 141 sends an operation termination report to the instruction completion controller circuit 171 in X2 (cycle 2). At the same time as the operation termination report, the operation execution controller circuit 141 also sends the IID of the operation instruction and information of the operation latency being 6 cycles to the instruction completion controller circuit 171. When the instruction of the operation termination report is ready to be completed in the next cycle, the instruction completion controller circuit 171 carries out an instruction completion control (C: cycle 3). With the instruction completion control, an IID of the ready-to-be-completed instruction is input to the FPSR 178, and the flip-flops 1781-$k$ are updated (W1 to W5: cycle 4 to cycle 8).

When a floating-point operation by the floating-point operation circuit 143 is terminated, the operation execution controller circuit 141 sends an execution termination report and an IID again to the instruction completion controller circuit 171 (cycle 7). The IID output from the operation execution controller circuit 141 is input to the comparison circuits 1782-$k$.

Because an exception is detected in the floating-point operation, the floating-point operation circuit 143 outputs the operation exception to the comparison circuits 1782-$k$ in the FPSR update circuit 178 in the instruction completion controller circuit 171 at the time of operation termination.

At a timing at which an operation exception is sent from the floating-point operation circuit 143 to the comparison circuits 1782-$k$, an IID of an operation instruction from the operation execution controller circuit 141 and an IID from the flip-flop 1781-4 match in the comparison circuit 1782-5. When the match between the IIDs is detected, the comparison circuit 1782-5 captures a signal of the operation exception from the floating-point operation circuit 143 (operation exception capture) and outputs the operation exception to the flip-flop 1781-5. When the flip-flop 1781-5 receives the operation exception, the flip-flop 1781-5 outputs the operation exception to the FPSR 182 (FPSR update instruction) and stores information of the operation exception being detected in the FPSR 182 (cycle 8). As a result, the data stored in the FPSR 182 changes from "A" to "B" that indicates detection of an operation exception.

Next, execution of an instruction to read out data from the FPSR 182 is explained.

When the core 111-1 executes an instruction to directly read out the FPSR 182, the core 111-1 carries out a control that does not allow instruction decoding until instructions before the instruction to directly read out the FPSR 182 are all completed. This control is started when the instruction to directly read out the FPSR 182 comes at the beginning of a program. The instruction decoder circuit 121 decodes the instruction to directly read out the FPSR 182 when no entries are present in the CSE 172.

However, in the case in which an instruction to update the FPSR 182 is completed before the FPSR 182 is updated, when the instruction decoder circuit 121 starts decoding the instruction to directly read out the FPSR 182, the FPSR 182 is read out before being updated, and correct data is not read out.

For that reason, when an instruction to update the FPSR 182 is decoded, the instruction decoder circuit 121 validates a signal indicating that an instruction to update the FPSR 182 is decoded and retains an IID assigned to the decoded instruction to update the FPSR 182. When the retained IID matches the IID for updating the FPSR 182, the instruction decoder circuit 121 invalidates the signal indicating that the instruction to update the FPSR 182 is decoded. When the signal indicating that the instruction to update the FPSR 182 is decoded is invalid, the instruction decoder circuit 121 can decode the instruction to directly read out the FPSR 182. It is noted that when the instruction decoder circuit 121 decodes a new instruction to update the FPSR 182 before updating the FPSR 182 according to the instruction of the retained IID, the retained IID is overwritten with an IID of the new instruction to update the FPSR 182. Until then, even when the FPSR 182 is updated by the instruction of the retained IID, the signal indicating that the instruction to update the FPSR 182 is decoded is not invalidated because the IIDs do not match. By performing this control, a correct value of the FPSR 182 can be read out after the update of the FPSR 182 is completed when an instruction immediately before the instruction to directly read out the FPSR 182 is an instruction to update the FPSR 182. The instruction to directly readout the FPSR 182 can be executed when an instruction that does not update the FPSR 182 is present in the CSE 172.

Figure 15:
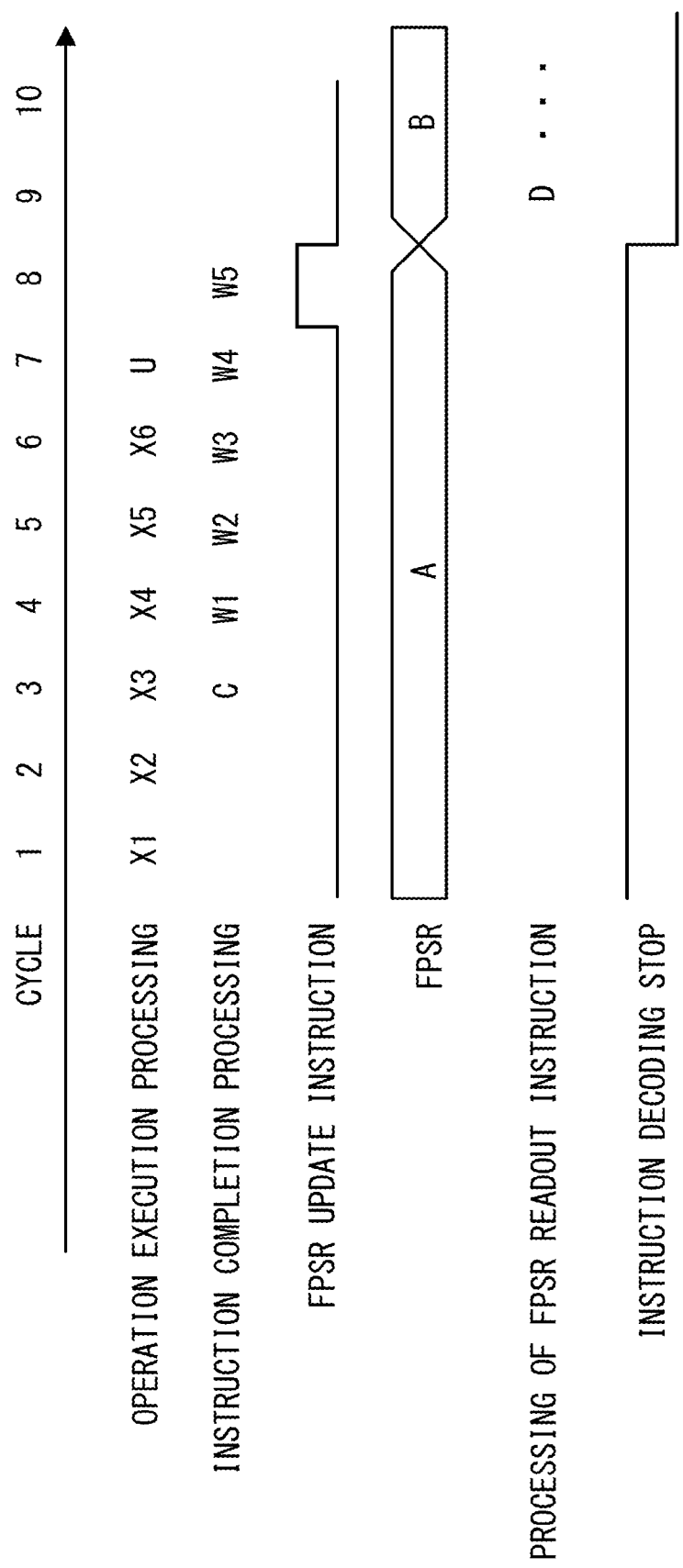
FIG. 15 is a timing chart of operations for an instruction to read out the FPSR.

FIG. 15 is a timing chart of operations for an instruction to read out the FPSR.

FIG. 15 provides from the top, cycle, operation execution processing, instruction completion processing, FPSR update instruction, FPSR, processing of FPSR readout instruction, and instruction decoding stop.

FIG. 15 illustrates operations carried out when a floating-point operation instruction with a 6-cycle latency is completed within the earliest possible period of time from an operation start. FIG. 15 illustrates operation to readout the FPSR 182 when the setting is configured in the FPCR 181 so that exception handling is not performed even when an exception is detected in the floating-point operation. FIG. 15 illustrates a case in which the FPSR 182 is updated in accordance with an instruction immediately before an instruction to read out the FPSR 182. In FIG. 15, the FPSR 182 is updated in the same manner as FIG. 14.

When a floating-point operation instruction to update the FPSR 182 is decoded, the instruction decoder circuit 121 validates a signal indicating that the instruction to update the FPSR 182 is decoded. When the signal indicating that the instruction to update the FPSR 182 is decoded is valid, the instruction decoder circuit 121 does not decode the instruction to read out the FPSR 182 because an instruction decode stop signal is valid.

In FIG. 15, a cycle in which the last floating-point operation instruction with a 6-cycle latency to update the FPSR 182 updates the FPSR 182 is W5 (cycle 8). At that time, because the IID of an instruction to update the FPSR 182 and the IID retained in the instruction decoding match, the instructions to update the FPSR 182 are considered to be all completed, the signal indicating that the instruction to update the FPSR 182 is decoded becomes invalid, and the instruction decoding stop is terminated. For that reason, the instruction decoder circuit 121 can decode (D) the instruction to read out the FPSR 182. The instruction decoding stop becomes a L level in cycle 9, the instruction to read out the FPSE 182 is decoded (D) and the data in the FPSR 182 is readout in cycle 9. In this manner, by the decoded instruction to read out the FPSR 182, the latest value in the FPSR 182 can be correctly read out.

In the case in which a floating-point operation instruction with a long latency is present, when a timing to report execution termination of the floating-point operation instruction to an instruction completion control is in a cycle (X2) following a timing at which the data of source operands is determined, a floating-point renaming register for storing the operation result may be allocated to a subsequent instruction. For that reason, when an operation latency of an instruction to be executed is long, the timing to send an execution termination report from the operation execution controller circuit 141 to the instruction completion controller circuit 171 is desirably not a timing at which the data of source operands is determined. When a renaming register released upon instruction completion is newly allocated to a subsequent instruction and a result of operation execution is stored in the renaming register by the time at which an operation of an instruction with a long operation latency is terminated, the order of the instructions may become incorrect. In view of this point, in a case of an instruction with a long operation latency being executed, the operation execution controller circuit 141 sends the operation termination report to the instruction completion controller circuit 171 at a timing at which a result of the subsequent instruction being stored in the renaming register will not occur. In this manner, floating-point operation instructions can be executed in a correct manner.

According to the CPU of the embodiments, when the setting is configured so that exception handling is not performed even when an exception is detected in a floating-point operation, a floating-point operation instruction can be completed in a shorter time and a period of time for floating-point renaming register allocation can be reduced. As a result, the CPU according to the embodiments can reduce the occurrence of a shortage of a floating-point renaming register.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processor, comprising:
    an arithmetic circuit configured to perform a floating-point operation;
    a floating-point register configured to include a plurality of entries, each of the plurality of entries being allocated to one of an architectural register and a renaming register;
    an operation execution controller circuit configured to issue a floating-point operation instruction and to output a termination report of the floating-point operation before the floating-point operation is terminated by the arithmetic circuit;
    an instruction completion controller circuit configured to output a release instruction that indicates a release of the renaming register after the termination report is received and instruction execution is completed when a setting is configured in the arithmetic processor so that exception handling is not performed at a time of instruction completion even when an exception is detected in an operation of the floating-point operation instruction; and
    an instruction decoder circuit configured to receive the release instruction, to allocate a first entry allocated to an architectural register that stores an execution result of the floating-point operation to a renaming register, and to allocate a second entry allocated to a renaming register in the floating-point operation to the architectural register that stores the execution result of the floating-point operation.

2. The arithmetic processor according to claim 1, wherein the operation execution controller circuit outputs the termination report when data of a source operand of the floating-point operation instruction is determined.

3. The arithmetic processor according to claim 1, wherein when a setting is configured in the arithmetic processor so that exception handling is performed at a time of instruction completion when an exception is detected in an operation of the floating-point operation instruction, the instruction completion controller circuit outputs the release instruction after a prescribed period of time has elapsed since the termination report is received.

4. A control method of an arithmetic processor having a floating-point register that includes a plurality of entries, each of the plurality of entries being allocated to one of an architectural register and a renaming register, the control method comprising:
- performing a floating-point operation by an arithmetic circuit in the arithmetic processor;
- by an operation execution controller circuit in the arithmetic processor, issuing a floating-point operation instruction and outputting a termination report of the floating-point operation before the floating-point operation is terminated by the arithmetic circuit;
- by an instruction completion controller circuit in the arithmetic processor, outputting a release instruction that indicates a release of the renaming register after the termination report is received and instruction execution is completed when a setting is configured in the arithmetic processor so that exception handling is not performed at a time of instruction completion even when an exception is detected in an operation of the floating-point operation instruction; and
- by an instruction decoder circuit, receiving the release instruction, allocating a first entry allocated to an architectural register that stores an execution result of the floating-point operation to a renaming register, and allocating a second entry allocated to a renaming register in the floating-point operation to the architectural register that stores the execution result of the floating-point operation.

5. The control method according to claim 4, wherein
the outputting the termination report of the floating-point operation outputs the termination report when data of a source operand of the floating-point operation instruction is determined.

6. The control method according to claim 4, wherein
the outputting the release instruction outputs the release instruction after a prescribed period of time has elapsed since the termination report is received when a setting is configured in the arithmetic processor so that exception handling is performed at a time of instruction completion when an exception is detected in an operation of the floating-point operation instruction.

* * * * *